United States Patent

Wade et al.

(10) Patent No.: US 9,449,174 B2
(45) Date of Patent: Sep. 20, 2016

(54) FINGERPRINT ANALYSIS FOR ANTI-VIRUS SCAN

(71) Applicant: Quantum Corporation, San Jose, CA (US)

(72) Inventors: Gregory L. Wade, San Jose, CA (US); J. Mitchell Haile, Somerville, MA (US)

(73) Assignee: Quantum Corporation, San Jose, CA (US)

(*) Notice: Subject to any disclaimer, the term of this patent is extended or adjusted under 35 U.S.C. 154(b) by 71 days.

(21) Appl. No.: 14/445,338

(22) Filed: Jul. 29, 2014

(65) Prior Publication Data

US 2014/0337981 A1 Nov. 13, 2014

Related U.S. Application Data

(63) Continuation of application No. 12/783,899, filed on May 20, 2010, now Pat. No. 8,893,277.

(60) Provisional application No. 61/261,526, filed on Nov. 16, 2009.

(51) Int. Cl.
*G06F 21/56* (2013.01)
*H04L 29/06* (2006.01)
*G06F 21/50* (2013.01)

(52) U.S. Cl.
CPC ............ *G06F 21/565* (2013.01); *G06F 21/50* (2013.01); *G06F 21/566* (2013.01); *H04L 63/145* (2013.01); *H04L 63/1416* (2013.01)

(58) Field of Classification Search
CPC .... G06F 21/56; G06F 21/564; G06F 21/568; G06F 21/561; G06F 21/565; G06F 21/50; G06F 21/566; H04L 63/145; H04L 63/1416
See application file for complete search history.

(56) References Cited

U.S. PATENT DOCUMENTS

| | | | |
|---|---|---|---|
| 6,094,731 A | 7/2000 | Waldin et al. | |
| 6,952,776 B1 * | 10/2005 | Chess | G06F 21/564 707/999.103 |
| 7,216,366 B1 | 5/2007 | Raz et al. | |
| 7,472,242 B1 * | 12/2008 | Deshmukh | G06F 11/1451 711/162 |
| 7,802,302 B1 * | 9/2010 | Nagarkar | G06F 21/564 711/161 |
| 7,904,419 B1 | 3/2011 | Milby et al. | |
| 7,917,481 B1 * | 3/2011 | Kale | G06F 21/562 707/693 |
| 8,135,930 B1 | 3/2012 | Mattox et al. | |
| 8,607,066 B1 * | 12/2013 | Kailash | H04L 63/1441 713/188 |
| 8,667,591 B1 * | 3/2014 | Claudatos | G06F 21/564 726/24 |
| 8,949,825 B1 * | 2/2015 | Fitzgerald | G06F 9/45537 718/1 |
| 2002/0095598 A1 | 7/2002 | Camble et al. | |
| 2004/0010732 A1 | 1/2004 | Oka | |
| 2005/0015599 A1 | 1/2005 | Wang et al. | |
| 2005/0132184 A1 * | 6/2005 | Palliyil | G06F 21/56 713/152 |
| 2005/0132206 A1 | 6/2005 | Palliyil et al. | |
| 2006/0136720 A1 | 6/2006 | Armstrong et al. | |
| 2006/0179083 A1 * | 8/2006 | Kulkarni | G06F 11/1451 |
| 2007/0074290 A1 | 3/2007 | Kobayashi et al. | |

(Continued)

*Primary Examiner* — Darren B Schwartz

(57) ABSTRACT

Disclosed are systems and methods for fingerprint analysis for anti-virus scanning. In an embodiment, a method of scanning for infected data items is disclosed. The method provides identifying a plurality of changed data items on a server machine. The method further provides, from a data system in communication with the server machine, performing a virus scan on the plurality of changed data items. The method further provides that the data system maintains a list of data items that the virus scan found to be infected.

9 Claims, 8 Drawing Sheets

(56) References Cited

U.S. PATENT DOCUMENTS

| | | |
|---|---|---|
| 2007/0240217 A1 | 10/2007 | Tuvell et al. |
| 2007/0266436 A1* | 11/2007 | Ballard ................ G06F 21/562 726/24 |
| 2007/0271610 A1 | 11/2007 | Grobman |
| 2007/0283438 A1* | 12/2007 | Fries ................... G06F 11/1448 726/24 |
| 2007/0283439 A1 | 12/2007 | Ballard |
| 2008/0133518 A1 | 6/2008 | Kapoor et al. |
| 2008/0134337 A1 | 6/2008 | Crescenzo et al. |
| 2008/0263658 A1 | 10/2008 | Michael et al. |
| 2009/0083852 A1* | 3/2009 | Kuo ...................... G06F 21/564 726/22 |
| 2009/0089879 A1* | 4/2009 | Wang ...................... G06F 21/53 726/24 |
| 2009/0089880 A1* | 4/2009 | Kobayashi ............. G06F 21/56 726/24 |
| 2009/0113151 A1* | 4/2009 | Teranishi ............. G06F 21/564 711/162 |
| 2009/0158432 A1 | 6/2009 | Zheng et al. |
| 2009/0240904 A1 | 9/2009 | Austruy et al. |
| 2009/0320134 A1* | 12/2009 | Corcoran ............. G06F 21/562 726/24 |
| 2010/0011178 A1 | 1/2010 | Feathergill |
| 2010/0031359 A1* | 2/2010 | Alme ..................... G06F 21/56 726/24 |
| 2010/0138924 A1* | 6/2010 | Heim .................... G06F 21/566 726/24 |
| 2010/0251363 A1 | 9/2010 | Todorovic |
| 2011/0191341 A1 | 8/2011 | Meyer et al. |
| 2012/0016840 A1 | 1/2012 | Lin et al. |

* cited by examiner

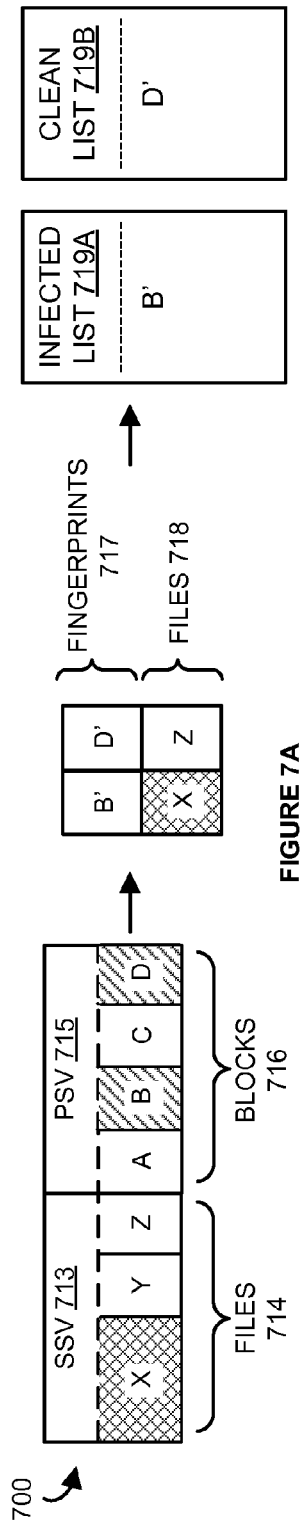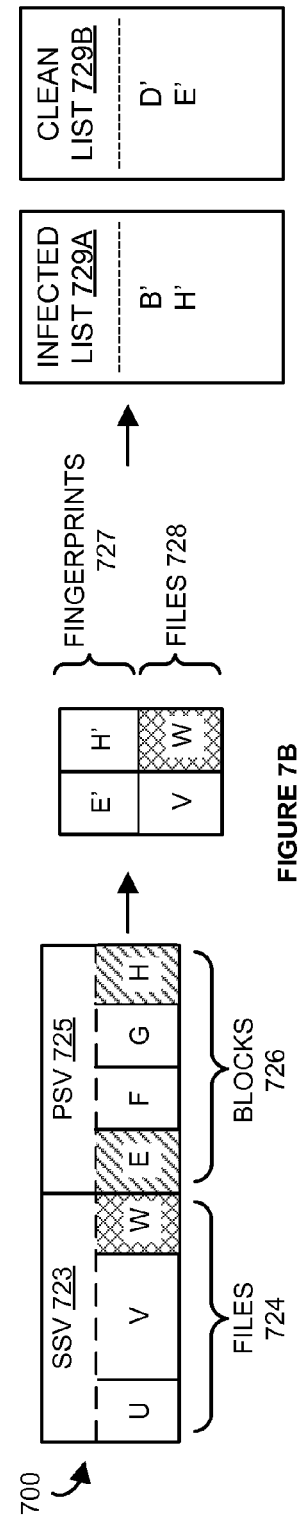
FIGURE 7A
FIGURE 7B
FIGURE 7C

FINGERPRINT ANALYSIS FOR ANTI-VIRUS SCAN

RELATED APPLICATIONS

This application is a continuation of U.S. patent application Ser. No. 12/783,899, entitled "FINGERPRINT ANALYSIS FOR ANTI-VIRUS SCAN," filed on May 20, 2010; which is related to and claims priority to U.S. Provisional Patent Application No. 61/261,526, entitled "Incremental Virus Scanning," filed on Nov. 16, 2009, and which are both hereby incorporated by reference in its entirety.

TECHNICAL BACKGROUND

In the field of computer hardware and software technology, a virtual machine is a software implementation of a machine (computer) that executes program instructions like a real machine. Virtual machine technology allows for the sharing of, between multiple virtual machines, the physical resources underlying the virtual machines.

In virtual machine environments, storage volumes within the virtual machines contain data items that need to be accessed and scanned. Unfortunately, accessing the underlying contents of a storage volume can be very resource intensive, reducing the performance of a virtual machine and other operations within a virtual machine environment.

OVERVIEW

Disclosed are systems and methods for fingerprint analysis for anti-virus scanning. In an embodiment, a method of scanning for infected data items is disclosed. The method provides identifying a plurality of changed data items on a server machine. The method further provides, from a data system in communication with the server machine, performing a virus scan on the plurality of changed data items. The method further provides that the data system maintains a list of data items that the virus scan found to be infected.

In some embodiments, identifying the plurality of changed data items comprises identifying a plurality of changed blocks in a primary storage volume on the server machine and identifying the plurality of changed data items from a plurality of data items on a secondary storage volume within the primary storage volume, wherein the plurality of changed data items correspond to the plurality of changed blocks.

In some embodiments, performing the virus scan comprises identifying a fingerprint within the plurality of changed blocks that indicates an infected data item in the secondary storage volume.

In some embodiments, the fingerprint is identified based on a reference fingerprint in an infected fingerprint list.

In some embodiments, the method further provides receiving the plurality of changed data items in the data system from the server machine.

In another embodiment, a non-transitory computer readable medium is provided having instructions stored thereon for operating a data system. When executed by the data system, the instructions direct the data system to perform a method of scanning for infected data items. The method includes identifying a plurality of changed data items on a server machine and performing a virus scan on the plurality of changed data items. The method further includes maintaining a list of data items that the virus scan found to be infected.

In yet another embodiment a data system comprising a processor and a storage system is provided. The processor is configured to identify a plurality of changed data items on a server machine and perform a virus scan on the plurality of changed data items. The storage system is configured to maintain a list of data items that the virus scan found to be infected.

BRIEF DESCRIPTION OF THE DRAWINGS

FIGS. 7A-7C illustrate the operation of a data identification system according to an embodiment.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In virtual machine environments, accessing the underlying contents of a storage volume can be very resource intensive, reducing the performance of a virtual machine and other operations within a virtual machine environment. Furthermore, in virtual machine environments it is often the case that multiple virtual machines with multiple storage volumes are presents. Nonetheless, individual data items on each storage volume need to be accessed.

In one example, when scanning data files for viruses, anti-virus software must walk the contents of a file system and scan files looking for infections. However, as with many processes, the scan process scales with the total number of files that need to be scanned. Thus, if the number of files that need scanning can be reduced, then the time to do the scan process can be reduced.

One way in which the number of data items on which a process needs to operate can be reduced is by operating only on those data items that have changed. This method can be further enhanced across multiple data volumes by generating a checksum (or fingerprint) for each changed block. In this way, fingerprints associated with blocks corresponding to data items that are found to have an infection (e.g., a virus, worm, etc), or not have an infection, need not be scanned in the following data volumes to determine if underlying data items have an infection or are clean. Rather, data items with infections and data items that are clean can be determined by simply comparing fingerprints.

Figure 1:
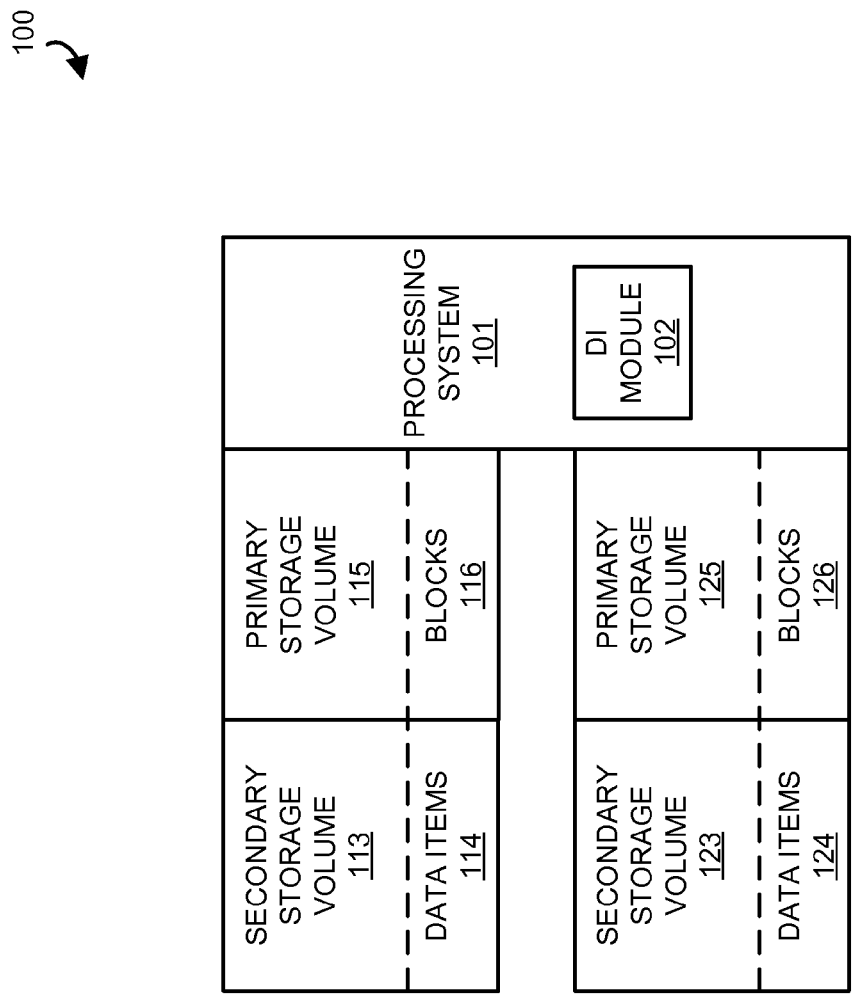
FIG. 1 illustrates a data identification system according to an embodiment.

Referring now to FIG. 1, data identification system 100 is illustrated in an embodiment whereby data identification (DI) module 102 is implemented in the data identification system 100 in order to identify data items in secondary storage volumes. Data identification system 100 includes processing system 101, primary storage volume 115, secondary storage volume 113, primary storage volume 125, and secondary storage volume 123.

Processing system 101 includes DI module 102. Processing system 101 comprises any system or collection of systems capable of executing DI module 102 to identify data items 114 in secondary storage volume 113 and data items 124 in secondary storage volume 123. Processing system 101 may be a micro-processor, an application specific integrated circuit, a general purpose computer, a server computer, or any combination or variation thereof. Data identification module 102 may be program instructions executable by processing system 101.

Primary storage volumes 115 and 125, and secondary storage volumes 113 and 123, may be any storage volumes capable of storing a volume of data. Primary storage volumes 115 and 125 comprise blocks 116 and blocks 126, respectively. Each block of blocks 116 comprises a section of primary storage volume 115 that corresponds to one or more data items in secondary storage volume 113. Similarly, each block of blocks 126 comprises a section of primary storage volume 125 that corresponds to one or more data items in secondary storage volume 123.

Secondary storage volumes 113 and 123 comprise data items 114 and data items 124, respectively. Data items 114 comprise the volume of data in secondary storage volume 113. Likewise, data items 124 comprise the volume of data in secondary storage volume 123.

Data items 114 and 124 may be, for example, data files on a virtual drive. In this example, secondary storage volumes 113 and 123 may be virtual storage volumes or drives, and data items 114 and 124 may be the virtual storage contents of a data volume in storage volume 113 and 123. The data volumes may be stored within another storage volume, such as primary storage volumes 115 and 125. Blocks 116 and 126 may then comprise sections of the data volume in primary storage volume 115 and primary storage volume 125, respectively.

Processing system 101 and/or primary storage volume 115 may track blocks 116 of the data volume in primary storage volume 115 that have changed. Similarly, processing system 101 and/or primary storage volume 125 may track blocks 126 of the data volume in primary storage volume 125 that have changed. Processing system 101, executing DI module 102, processes the changed blocks to generate and compare fingerprints.

Figure 2:
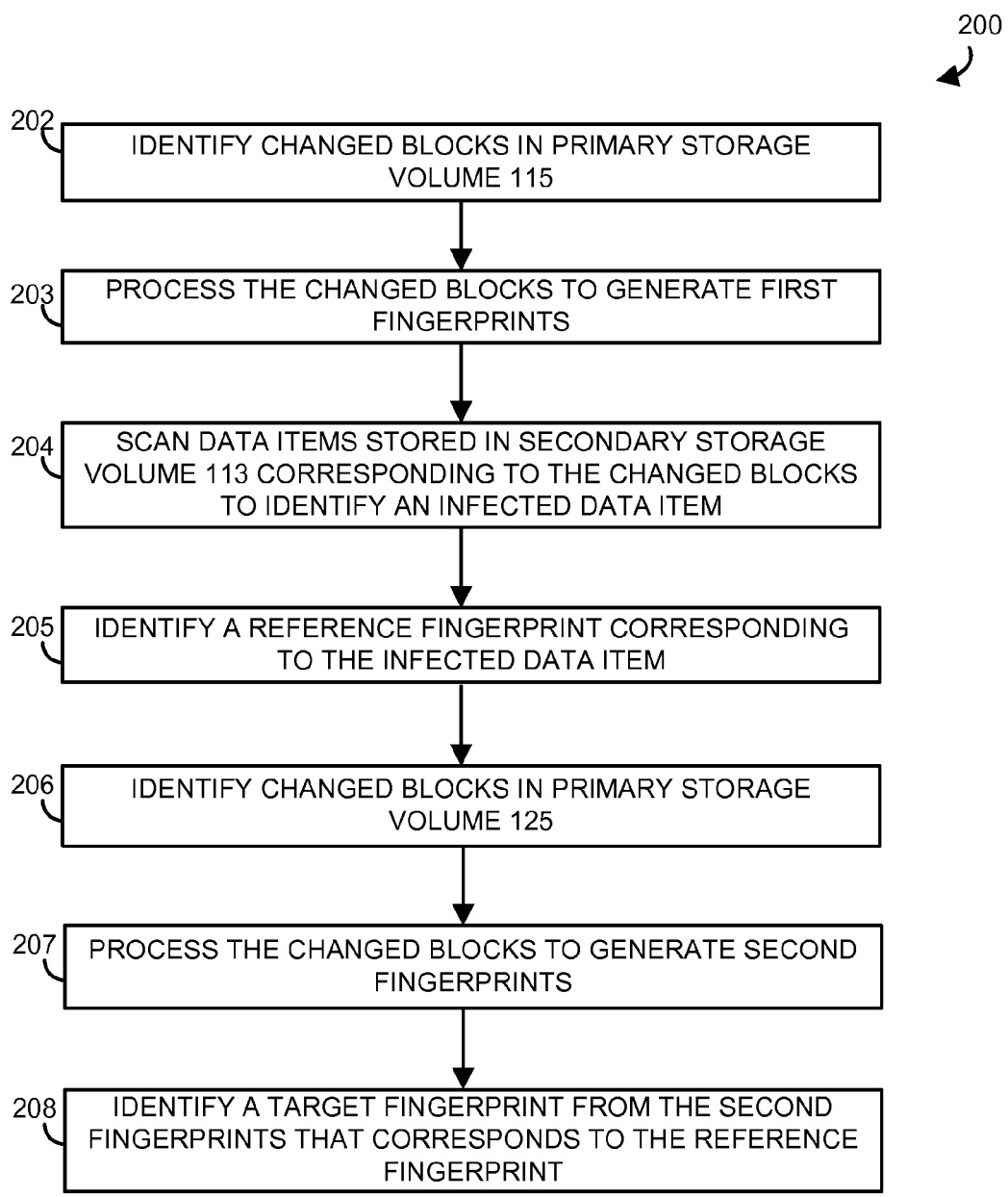
FIG. 2 illustrates the operation of a data identification system according to an embodiment.

FIG. 2 illustrates process 200 describing the operation of data identification system 100. To begin, a volume of data is generated and stored. Processing system 101 identifies changed blocks of blocks 116 on primary storage volume 115 (Step 202) and processes the changed blocks to generate fingerprints (Step 203). In one example of operation, fingerprints are created by generating a checksum for each of the changed blocks. The checksum may be any fixed-sized datum computed from the changed blocks on a specified storage volume for the purpose of comparing to generated checksums of changed blocks on other storage volumes. If the checksums match, then the changed blocks are almost certainly the same.

Processing system 101, executing DI module 102, identifies data items of data items 114 on secondary storage volume 113 corresponding to the changed blocks of blocks 116 on primary storage volume 115. Processing system 101 scans the data items to identify an infected data item (Step 204). A data item may be, for example, a file.

Processing system 101 subsequently identifies a reference fingerprint corresponding to the infected data item (Step 205). Typically a data item spans multiple blocks (depending on the size or length of the data item) and thus corresponds to one or more blocks of blocks 116. In this case, either or both of the blocks corresponding to the data item may be marked as changed blocks. Nonetheless, a single data item or multiple data items may span a single block. In this case, the single block would correspond to the multiple data items.

In some embodiments, more than one reference fingerprint may be identified by processing system 101. Moreover, in some embodiments, the one or more reference fingerprints may be added to an infected fingerprint list. In this case, the infected fingerprint list contains those fingerprints whose underlying data items have been scanned and the processing system 101 has determined that the data items are infected.

Once the reference fingerprint or fingerprints have been identified, processing system 101 identifies changed blocks of blocks 126 on primary storage volume 125 (Step 206) and processes the changed blocks to generate a second set of fingerprints (Step 207).

Lastly, processing system 101 identifies a target fingerprint form the second set of reference fingerprints that corresponds to the reference fingerprint (Step 208). As previously discussed, if the fingerprints or checksums match, then the target fingerprint and the reference fingerprint are almost certainly the same.

Those skilled in the art will appreciate that any number of actions may be taken by processing system 101 in response to determining that the target fingerprint and the reference fingerprint match. Furthermore, it is also understood that multiple reference fingerprints may exist and that one or more of the reference fingerprints may be compared to the second set of fingerprints generated using the changed blocks of blocks 126 in order to determine more than one target fingerprint.

Figure 3:
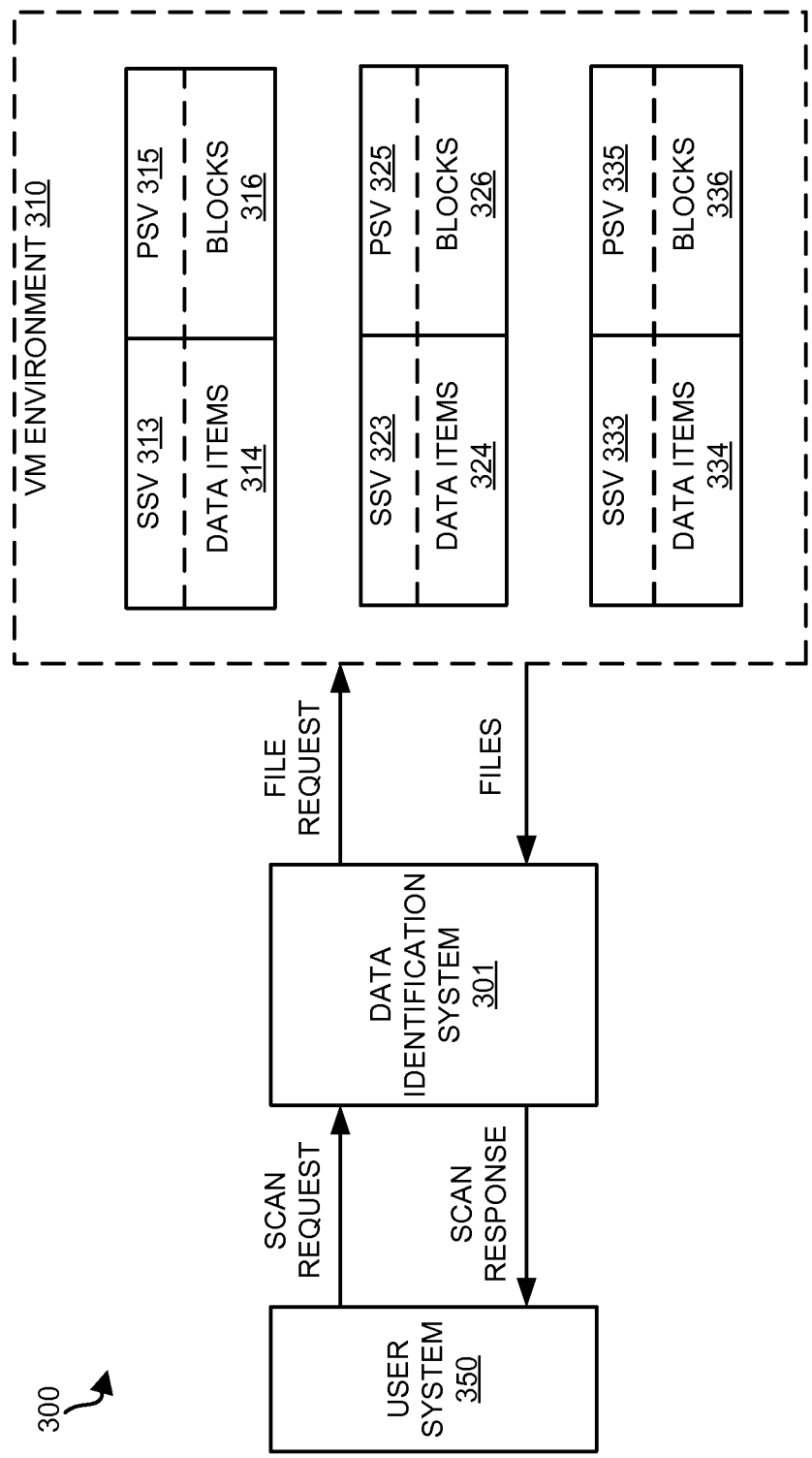
FIG. 3 illustrates a data identification system according to an embodiment.

FIG. 3 illustrates data identification environment 300 according to an embodiment. Data identification environment 300 includes user system 350, data identification system 301, and virtual machine environment 310. In this example, user system 350 is in communication with data identification system 301 and data identification system 301 is in communication with virtual machine environment 310.

In this example, data identification system 301 is implemented to identify files that need to be scanned within virtual machine environment 310 in response to a scan request from user system 350. As shown, data identification system 301 is separate from user system 350 and virtual machine environment 310. However, those skilled in the art will appreciate that data identification system 301, or elements thereof, may be co-located with user system 350 and/or virtual machine environment 310.

User system 350 may be any computer system, group of computer systems, custom hardware, or other device configured to request that a scan of files be performed on virtual machine environment 310. In one embodiment, user system 350 comprises a personal computer operated by a user who initiates the scan request. Alternatively and/or additionally, requests for other applications (e.g., such as data forensic applications) may be made. Furthermore, it should be understood that the user may be a human operator, as well as other software applications, hardware elements, or the like.

Data identification system 301 comprises any system or collection of systems capable receiving a scan request from user system 350 and identifying data items or files that need to be scanned. Data identification system 301 may be a micro-processor, an application specific integrated circuit, a general purpose computer, a server computer, or any combination or variation thereof. Typically, files within the virtual machine environment 310 need to be periodically scanned in order to make sure the files have not become infected or otherwise corrupted. For the purposes of this example, the process of scanning files to determine whether they are infected is separate and distinct from the process of cleaning infected files.

Elements of virtual machine environment 310 may include, for example, virtual machines, hypervisors, server machines, and other underlying virtual files. Other elements are also possible although not shown for simplicity. In this example, three primary storage volumes 315, 325, and 335 and three secondary storage volumes 313, 323, and 333 are shown for simplicity. Those skilled in the art will appreciate that each primary and secondary storage volume combination may represent a virtual machine and that each virtual machine may reside on a server machine. Moreover, a server machine may host multiple virtual machines. It is also appreciated that three primary and second storage volumes are shown in FIG. 3 for simplicity. Virtual machine environment 310 may contain any number of virtual machines.

In this example, secondary storage volumes 313, 323, and 333 are virtual storage volumes. Secondary storage volumes 313, 323, and 333 comprise files 314, 324, and 334, respectively. Underlying or primary storage volumes 315, 325, and 335 comprise blocks 316, 326, and 336, respectively.

Data identification system 301 and/or underlying storage volumes may track blocks of the data volumes in virtual machine environment 310 that have changed. In operation, data identification system 301 uses the changed blocks to determine files that have changed on the virtual storage volumes. As previously discussed, accessing files in the virtual machine environment 310 can be resource intensive. Thus, data identification system 301 uses changed blocks to generate fingerprints that can be used to compare against fingerprints generated for changed blocks on other data volumes. In some cases, this method can reduce file access.

Figure 4:
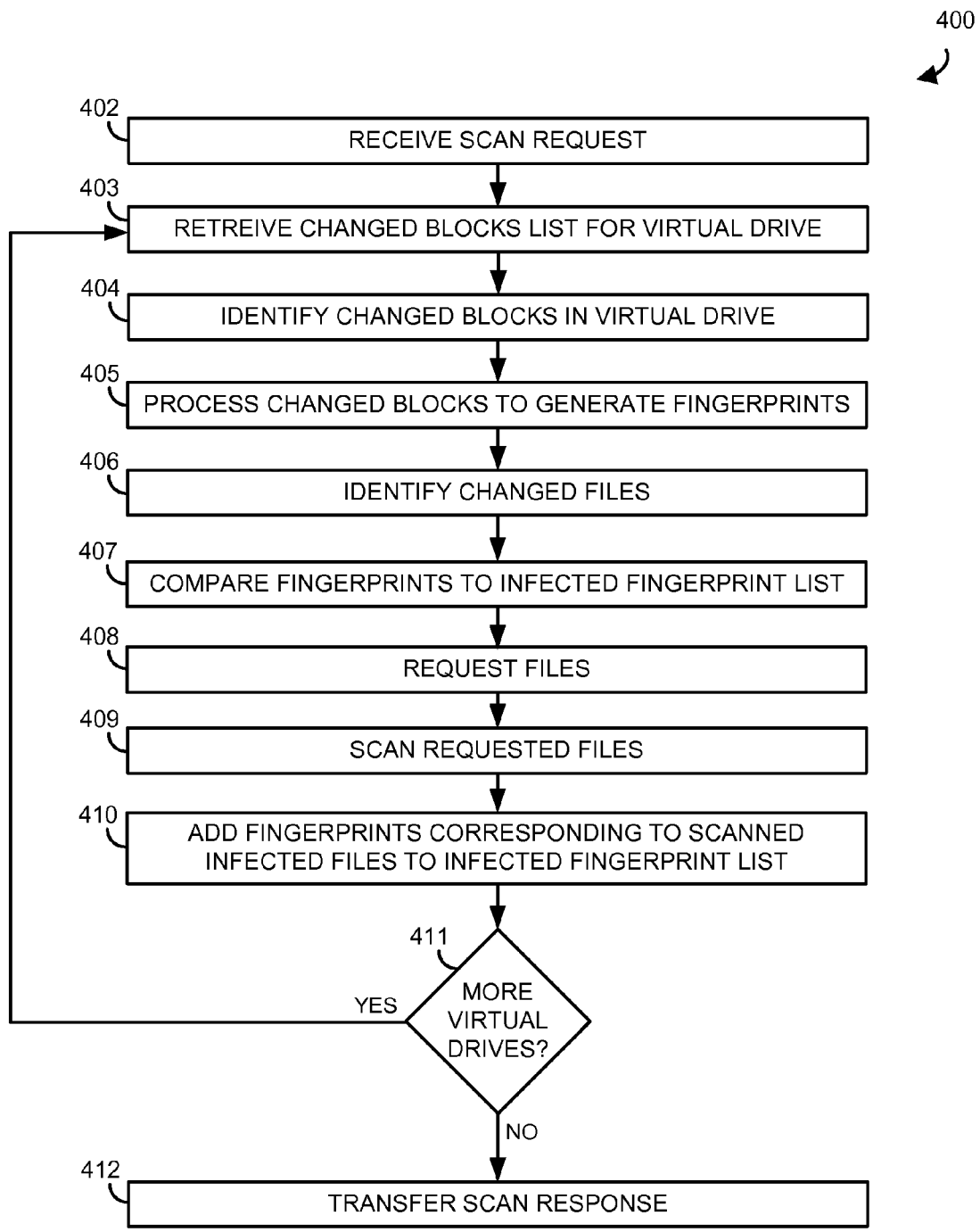
FIG. 4 illustrates the operation of a data identification system according to an embodiment.

FIG. 4 illustrates operation of data identification system 300 according to an embodiment for incrementally scanning virtual storage volumes on virtual machines in a virtual machine environment 310.

In this example, data identification system 301 first receives a scan request from user system 350 to scan files on storage volumes in virtual machine environment 310 (Step 402). Data identification system 301 subsequently retrieves a changed block list for a first virtual drive on a first virtual machine (Step 403). The changed block list may, for example, be retrieved from a guest O/S, a hypervisor, virtual hardware, or accessed via a V-disk file. Typically, the changed block list is generated by the hypervisor, the guest O/S, or the storage volume (i.e., primary storage volumes 315, 325, and 335). In this example, a changed block list including the changed blocks of blocks 316 is first received.

Once the changed block list is obtained, data identification system 301 identifies changed blocks on the virtual storage disk (Step 404). Data identification system 301 uses the changed blocks to generate one or more fingerprints (Step 405). In one example of operation, fingerprints are created by generating a checksum for each of the changed blocks. The checksum may be any fixed-sized datum computed from the changed blocks on a specified storage volume for the purpose of comparing to generated checksums of changed blocks on other storage volumes. If the checksums match, then the changed blocks are almost certainly the same.

Data identification system 301 then identifies changed files that correspond to the changed blocks (Step 406). Data identification system 301 may concurrently compare the generated fingerprints to fingerprints on the infected fingerprint list (Step 407). In this example, the infected fingerprint list is empty because the first virtual drive is being processed. However, when processing subsequent drives data identification system 301 will compare the fingerprints generated from the changed blocks to those fingerprints on the infected fingerprint list.

The infected fingerprint list contains fingerprints of changed blocks (on other virtual drives) that have corresponding files that have been previously scanned and found to be infected. If a fingerprint in the infected fingerprint list (reference fingerprint) matches a fingerprint generated by the changed blocks list on the virtual drive currently being processed (target fingerprint), then the file or files associated with the target fingerprint need not be requested from the virtual machine because data identification system 301 is already fairly certain that the file is infected, and thus needs to be cleaned.

Data identification system 301 requests files corresponding to the changed blocks (Step 408). As discussed, in some embodiments, data identification system 301 may selectively request files from the virtual machine environment 310 based on whether a reference fingerprint matches a target fingerprint. For example, if a reference fingerprint matches a target fingerprint, the files associated with the target fingerprint may not be requested. Conversely, if a match occurs, data identification system 301 may request all files on the virtual drive—including those files that have not changed.

Requested files are then scanned (Step 409). Those skilled in the art will appreciate that typically a file is not literally copied or transferred. Rather, a version can be transferred or copied. However, in some embodiments, the files may literally be transferred.

After the scan is completed, data identification system 301 may then add fingerprints corresponding to scanned infected files to the infected fingerprint list (Step 410). Data identification system 301 will use the infected fingerprint list as reference fingerprints on the next virtual drive.

Data identification system then determines whether there are more drives in the virtual machine environment that need to be scanned (Step 411). In some embodiments, if more virtual drives exist, then Steps 403-410 are repeated until each virtual drive is processed. Lastly, data identification system 301 transfers a scan response to user system 350 indicating the status of the scan and including information on which files, if any, are infected (Step 412). In some embodiments, user system 350 may then direct data identification system 301 to perform a deep clean on certain virtual drives or quarantine or fix specified files.

FIGS. 5A-5C illustrate a sequence of operations of data identification environment 300 of FIG. 3 according to an embodiment. Referring first to FIG. 3A, which illustrates a first virtual drive. To begin, data identification system 301 first receives a scan request from user system 350. In response, data identification system 301 retrieves a changed block list from the first virtual drive. In this case, data identification system 301 retrieves a changed block list from primary storage volume 515.

Figure 5:
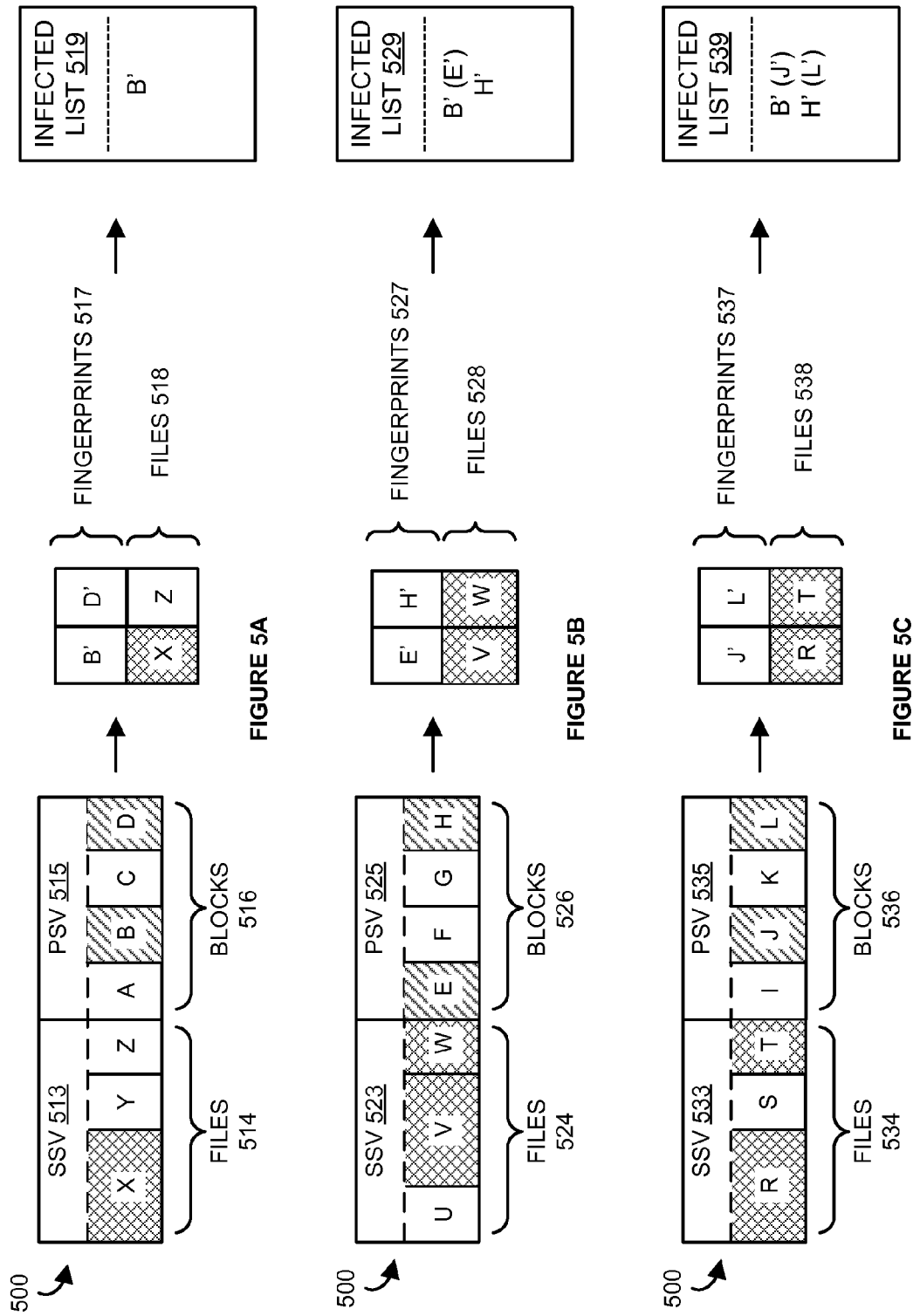
FIGS. 5A-5C illustrate the operation of a data identification system according to an embodiment.

Primary storage volume 515 includes blocks 516 (block A, block B, block C, and block D). Secondary storage volume 513 includes files 514 (file X, file Y, and file Z). In the example of FIG. 5, those blocks that have changed are shown with cross-shading. In this case, blocks B and D have changed. Once data identification system 301 identifies the blocks that have changed, data identification system 301 then generates fingerprints for those blocks. Fingerprints 517 (fingerprint B' and fingerprint D') are shown.

In this example, data identification system 301 also identifies the changed files associated with the changed blocks. For example, the corresponding changed files 518 (file X and file Z) are shown. The corresponding files are requested and scanned. File X is shown with cross-hatching to indicate that the file is infected. Thus, in this example, fingerprint B' is added to the infected list because it corresponds to the changed block B which corresponds to infected file X.

Continuing the example with FIG. 5B, which illustrates a second virtual drive. Data identification system 301 retrieves a changed block list from the second virtual drive. In this case, data identification system 301 retrieves a changed blocks list from primary storage volume 525.

Primary storage volume 525 includes blocks 526 (block E, block F, block G, and block H). Secondary storage volume 523 includes files 524 (file U, file V, and file W). In this case, block E and block H have changed in this virtual drive. Thus, data identification system 301 generates fingerprints 527 (fingerprint E' and fingerprint H') based on the changed blocks. Fingerprints 527 are then compared to infected list 519 (of FIG. 5A). In this example, the comparison reveals that B' and E' are equivalent. Thus, data identification system 301 already knows that file V is infected without requesting and scanning it.

Data identification system 301 then identifies file W as corresponding to changed block H and fingerprint H' (which did not match a fingerprint in the infected list 519). File W is requested and scanned indicating that it is also infected. Data identification system 301 subsequently adds fingerprint H' to the infected list because it corresponds to the changed block H which corresponds to infected file W. Infected file list 529 results.

Referring now to FIG. 5C, which illustrates a third virtual drive. Data identification system 301 retrieves a changed block list from the third virtual drive. In this case, data identification system 301 retrieves a changed block list from primary storage volume 535.

Primary storage volume 535 includes blocks 536 (block I, block J, block K, and block L). Secondary storage volume 533 includes files 534 (file R, file S, and file T). In this case, block J and block L have changed in this virtual drive. Thus, in this example, data identification system 301 generates fingerprints J' and L'. Fingerprints 537 are then compared to infected list 529 (of FIG. 5B). In this example, the comparison reveals that B' and J' are equivalent and H' and L' are equivalent. Thus, data identification system 301 knows that files R and T are infected without requesting and scanning the files.

In this example, because there are no more virtual drives in the virtual machine environment, data identification system 301 may subsequently transfers a scan response indicating that files X, V, W, R, and T are infected.

Figure 6:
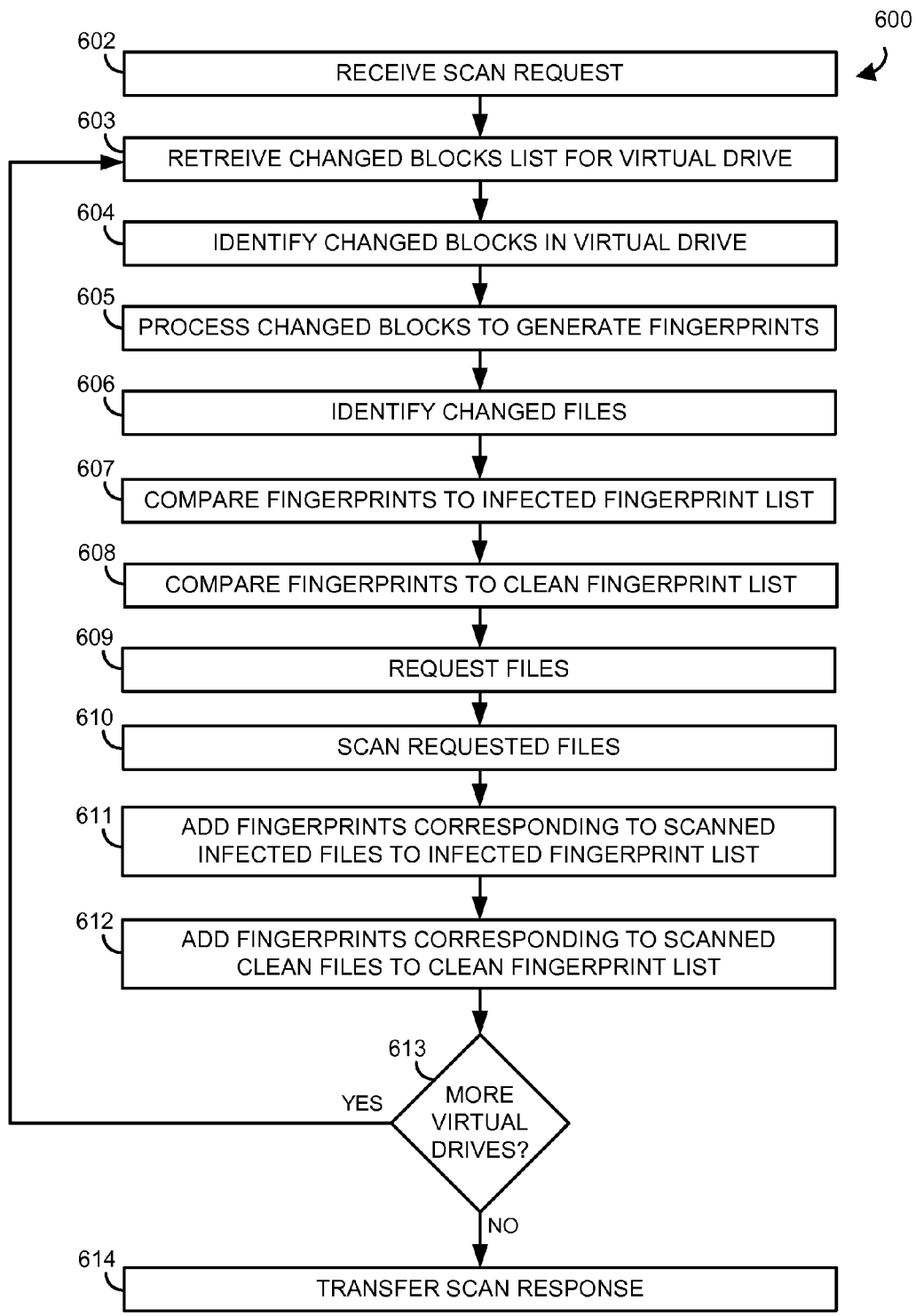
FIG. 6 illustrates the operation of a data identification system according to an embodiment.

FIG. 6 illustrates operation of data identification system 300 according to another embodiment for incrementally scanning virtual storage volumes on virtual machines in a virtual machine environment 310. This example is similar to the example of FIG. 4; however, in this example a clean fingerprint list is included in addition to the infected fingerprint list. While both lists are used in this example, those skilled in the art will appreciate that in some embodiments either list may be used individually.

To begin, data identification system 301 receives a scan request from user system 350 to scan files on storage volumes in virtual machine environment 310 (Step 602). Data identification system 101 subsequently retrieves a changed block list for a first virtual drive on a first virtual machine (Step 603). The changed block list may, for example, be retrieved from a guest O/S, a hypervisor, virtual hardware, or accessed via a V-disk file. Typically, the changed block list is generated by the hypervisor, the guest O/S, or the storage volume (i.e., primary storage volumes 315, 325, and 335). In this example, a changed block list including the changed blocks of blocks 316 is first received.

Once the changed block list is obtained, data identification system 301 identifies changed blocks on the virtual storage disk (Step 604). Data identification system 301 uses the changed blocks to generate one or more fingerprints (Step 605). In one example of operation, fingerprints are created by generating a checksum for each of the changed blocks. The checksum may be any fixed-sized datum computed from the changed blocks on a specified storage volume for the purpose of comparing to generated checksums of changed blocks on other storage volumes. If the checksums match, then the changed blocks are almost certainly the same.

Data identification system 301 then identifies changed files that correspond to the changed blocks (Step 606). Data identification system 301 may concurrently compare the generated fingerprints to fingerprints in the infected fingerprint list (Step 607). In this example, the infected fingerprint list is empty because the first virtual drive is being processed. However, when processing subsequent drives data identification system 301 will compare the fingerprints generated from the changed blocks to those fingerprints in the infected fingerprint list.

The infected fingerprint list contains fingerprints of changed blocks (on previously processed virtual drives) that have corresponding files that have been previously scanned and found to be infected. If a fingerprint in the infected fingerprint list (reference fingerprint) matches a fingerprint generated by the changed blocks list on the virtual drive currently being processed (target fingerprint), then the file or files associated with the target fingerprint need not be requested from the virtual machine because data identification system 301 is already fairly certain that the file is infected, and thus needs to be cleaned.

In this example, data identification system 301 may also concurrently compare the generated fingerprints to fingerprints in the clean fingerprint list (Step 608). In this example, the clean fingerprint list is empty because the first virtual drive is being processed. However, when processing subsequent drives data identification system 301 will compare the fingerprints generated from the changed blocks to those fingerprints in the clean fingerprint list.

The clean fingerprint list contains fingerprints of changed blocks (on previously processed virtual drives) that have corresponding files that have been previously scanned and found to be clean (i.e., not contain an infection or corruption). If a fingerprint in the clean fingerprint list (clean reference fingerprint) matches a fingerprint generated by the changed blocks list on the virtual drive currently being processed (clean target fingerprint), then the file or files associated with the clean target fingerprint need not be requested from the virtual machine because data identification system 301 is already fairly certain that the file is clean.

Data identification system 301 requests files corresponding to the changed blocks (Step 609). As discussed, in some embodiments, data identification system 301 may selectively request files from the virtual machine environment 310 based on whether a reference fingerprint matches a target fingerprint. For example, if a reference fingerprint matches a target fingerprint, the files associated with the target fingerprint may not be requested. Conversely, if a match occurs, data identification system 301 may request all files on the virtual drive—including those files that have not changed.

Requested files are then scanned (Step 610). Those skilled in the art will appreciate that typically a file is not literally copied or transferred. Rather, a version can be transferred or copied. However, in some embodiments, the files may literally be transferred.

After the scan is completed, data identification system 301 may then add fingerprints corresponding to scanned infected files to the infected fingerprint list (Step 611). Data identification system 301 will use the infected fingerprint list as reference fingerprints on the next virtual drive. Similarly, data identification system 301 may also add fingerprints corresponding to scanned clean files to the clean fingerprint list (Step 612). Data identification system 301 will use the clean fingerprint list as reference fingerprints on the next virtual drive.

Data identification system 301 then determines whether there are more drives in the virtual machine environment that need to be scanned (Step 613). In some embodiments, if more virtual drives exist, then Steps 403-410 are repeated until each virtual drive is processed. Lastly, data identification system 301 transfers a scan response to user system 350 indicating the status of the scan and including information on which files, if any, are infected (Step 614). In some embodiments, user system 350 may then direct data identification system 301 to perform a deep clean on certain virtual drives or quarantine or fix specified files.

FIGS. 7A-7C illustrate a sequence of operations of data identification environment 300 of FIG. 3 according to an embodiment. Referring first to FIG. 7A, which illustrates a first virtual drive. To begin, data identification system 301 first receives a scan request from user system 350. In response, data identification system 301 retrieves a changed block list from the first virtual drive. In this case, data identification system 301 retrieves a changed block list from primary storage volume 715.

Primary storage volume 715 includes blocks 716 (block A, block B, block C, and block D). Secondary storage volume 713 includes files 514 (file X, file Y, and file Z). In the example of FIG. 7, those blocks that have changed are shown with cross-shading. In this case, blocks B and D have changed. Once data identification system 301 identifies the blocks that have changed, data identification system 301 then generates fingerprints for those blocks. Fingerprints 717 (fingerprint B' and fingerprint D') are shown.

In this example, data identification system 301 also identifies the changed files associated with the changed blocks. For example, the corresponding changed files 718 (file X and file Z) are shown. The corresponding files are requested and scanned. File X is shown with cross-hatching to indicate that the file is infected. Thus, in this example, fingerprint B' is added to the infected list 719A because it corresponds to the changed block B which corresponds to infected file X.

File Z is shown without cross-hatching to indicate that the file is clean. Thus, in this example, fingerprint D' is added to the clean list 719B because it corresponds to the changed block D which corresponds to clean file Z.

Continuing the example with FIG. 5B, which illustrates a second virtual drive. Data identification system 301 retrieves a changed block list from the second virtual drive. In this case, data identification system 301 retrieves a changed blocks list from primary storage volume 725.

Primary storage volume 725 includes blocks 726 (block E, block F, block G, and block H). Secondary storage volume 723 includes files 724 (file U, file V, and file W). In this case, block E and block H have changed in this virtual drive. Thus, data identification system 301 generates fingerprints 727 (fingerprint E' and fingerprint H') based on the changed blocks.

Fingerprints 727 are then compared to infected list 719A and clean list 719B (of FIG. 7A). In this example, the comparison reveals no matches. File V is shown without cross-hatching to indicate that the file is clean. Thus, in this example, fingerprint E' is added to the clean list 719B because it corresponds to the changed block E which corresponds to clean file V. File W is shown with cross-hatching to indicate that the file is infected. Fingerprint H' is subsequently added to the infected list Referring now to FIG. 5C, which illustrates a third virtual drive. Data identification system 301 retrieves a changed block list from the third virtual drive. In this case, data identification system 301 retrieves a changed block list from primary storage volume 735.

Primary storage volume 735 includes blocks 736 (block I, block J, block K, and block L). Secondary storage volume 733 includes files 734 (file R, file S, and file T). In this case, block J and block L have changed in this virtual drive. Thus, in this example, data identification system 301 generates fingerprints J' and L'. Fingerprints 737 are then compared to infected list 729A and clean list 729B (of FIG. 5B). In this example, the comparison reveals that B' and J' are equivalent and D' and L' are equivalent. Thus, data identification system 301 knows that file R is infected without requesting and scanning the file. Similarly, data identification system 301 knows that file T is not infected without requesting and scanning the file.

In this example, because there are no more virtual drives in the virtual machine environment, data identification system 301 may subsequently transfers a scan response indicating that files X, W, and R are infected.

Figure 8:
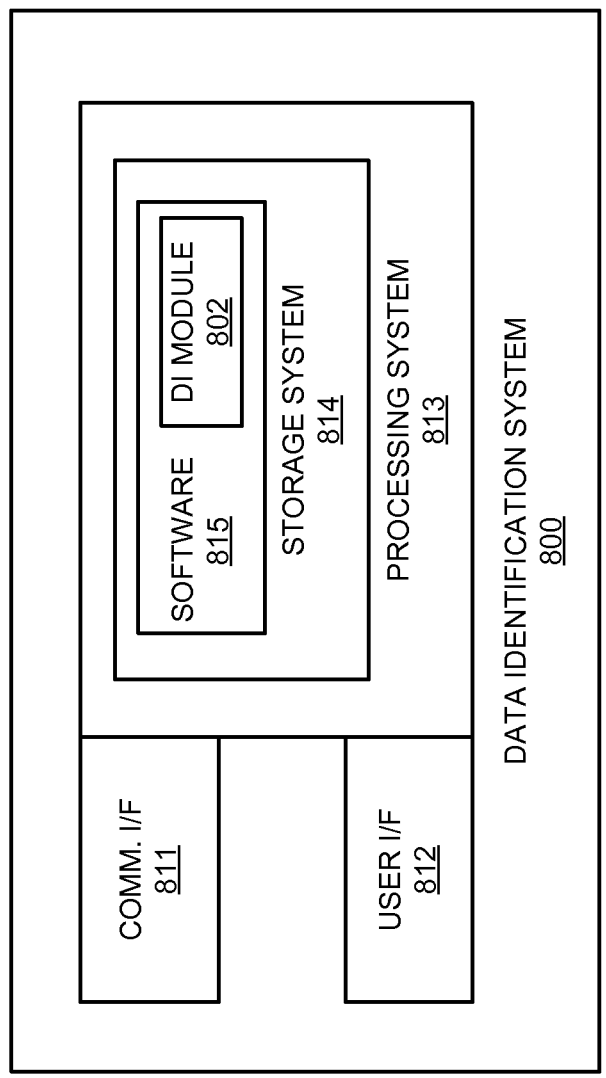
FIG. 8 illustrates a data identification system according to an embodiment.

FIG. 8 illustrates data identification system 800 in another embodiment. Data identification system 800 includes communication interface 811, user interface 812, processing system 813, storage system 814, and software 815. Software 815 includes DI module 802. Processing system 813 is linked to communication interface 811 and 812. Software 815 is stored on storage system 814. In operation, processing system 813 executes software 815, including DI module 802.

Communication interface 811 comprises a network card, network interface, port, or interface circuitry that allows data identification system 800 to communicate with primary and secondary storage volumes. Communication interface 811 may also include a memory device, software, processing circuitry, or some other communication device. Communication interface 811 may use various protocols, such as host bus adapters (HBA), SCSI, SATA, Fibre Channel, iSCI, WiFi, Ethernet, TCP/IP, or the like to communicate with a storage volume.

User interface 812 comprises components that interact with a user to receive user inputs and to present media and/or information. User interface 812 may include a speaker, microphone, buttons, lights, display screen, mouse, keyboard, or some other user input/output apparatus—including combinations thereof. User interface 812 may be omitted in some examples.

Processing system 813 may comprise a microprocessor and other circuitry that retrieves and executes software 815, including DI module 802, from storage system 814. Storage system 814 comprises a disk drive, flash drive, data storage circuitry, or some other memory apparatus. Storage system 814 may further comprise primary and/or secondary storage volumes. The primary storage volume may comprise blocks or portions. The secondary storage volume may comprise data items. Processing system 813 is typically mounted on a circuit board that may also hold storage system 814 and portions of communication interface 811 and user interface 814.

Software 815 comprises computer programs, firmware, or some other form of machine-readable processing instructions. Software 815 may include an operating system, utilities, drivers, network interfaces, applications, virtual machines, or some other type of software. When executed by processing system 813, software 815 directs processing system 813 to operate data identification system 800 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of scanning for infected data items, the method comprising:
    identifying a first plurality of changed data blocks of a first virtual machine file stored on a server machine;
    from a data system in communication with the server machine, performing a virus scan on the first plurality of changed data blocks, wherein performing the virus scan comprises:
        processing the plurality of changed data blocks to generate a plurality of fingerprints;
        identifying a target fingerprint from the plurality of fingerprints using a reference fingerprint, wherein the reference fingerprint is generated from a second plurality of changed data blocks of a second virtual machine file representing an infected data item in the second virtual machine file; and
        identifying the infected data item corresponding to the target fingerprint within a plurality of data items in the first virtual machine file; and
    in the data system, adding the infected data item to a list of data items in the first virtual machine file that the virus scan found to be infected.

2. The method of claim 1, wherein the reference fingerprint is one of a plurality of reference fingerprints.

3. The method of claim 1, further comprising:
    receiving the plurality of changed data blocks in the data system from the server machine.

4. A non-transitory computer readable medium having instructions stored thereon for operating a data system that, when executed by the data system, direct the data system to perform a method of scanning for infected data items, the method comprising:
    identifying a first plurality of changed data blocks of a first virtual machine file stored on a server machine;
    performing a virus scan on the first plurality of changed data blocks, wherein performing the virus scan comprises:
        processing the plurality of changed data blocks to generate a plurality of fingerprints;
        identifying a target fingerprint from the plurality of fingerprints using a reference fingerprint, wherein the reference fingerprint is generated from a second plurality of changed data blocks of a second virtual machine file representing an infected data item in the second virtual machine file; and
        identifying the infected data item corresponding to the target fingerprint within a plurality of data items in the first virtual machine file; and
    adding the infected data item to a list of data items in the first virtual machine file that the virus scan found to be infected.

5. The non-transitory computer readable medium of claim 4, wherein the reference fingerprint is one of a plurality of reference fingerprints.

6. The non-transitory computer readable medium of claim 4, further comprising:
    receiving the plurality of changed data blocks from the server machine.

7. A data system comprising:
    a processor configured to identify a first plurality of changed data blocks of a first virtual machine file stored on a server machine, and perform a virus scan on the first plurality of changed data blocks, wherein performing the virus scan comprises:
        processing the plurality of changed data blocks to generate a plurality of fingerprints;
        identifying a target fingerprint from the plurality of fingerprints using a reference fingerprint, wherein the reference fingerprint is generated from a second plurality of changed data blocks of a second virtual machine file representing an infected data item in the second virtual machine file; and
        identifying the infected data item corresponding to the target fingerprint within a plurality of data items in the first virtual machine file; and
    a storage system configured to add the infected data item to a list of data items in the first virtual machine file that the virus scan found to be infected.

8. The data system of claim 7, wherein the reference fingerprint is one of a plurality of reference fingerprints.

9. The data system of claim 7, further comprising:
    a communication interface configured to receive the plurality of changed data blocks from the server machine.

* * * * *